United States Patent Office 3,319,887
Patented May 16, 1967

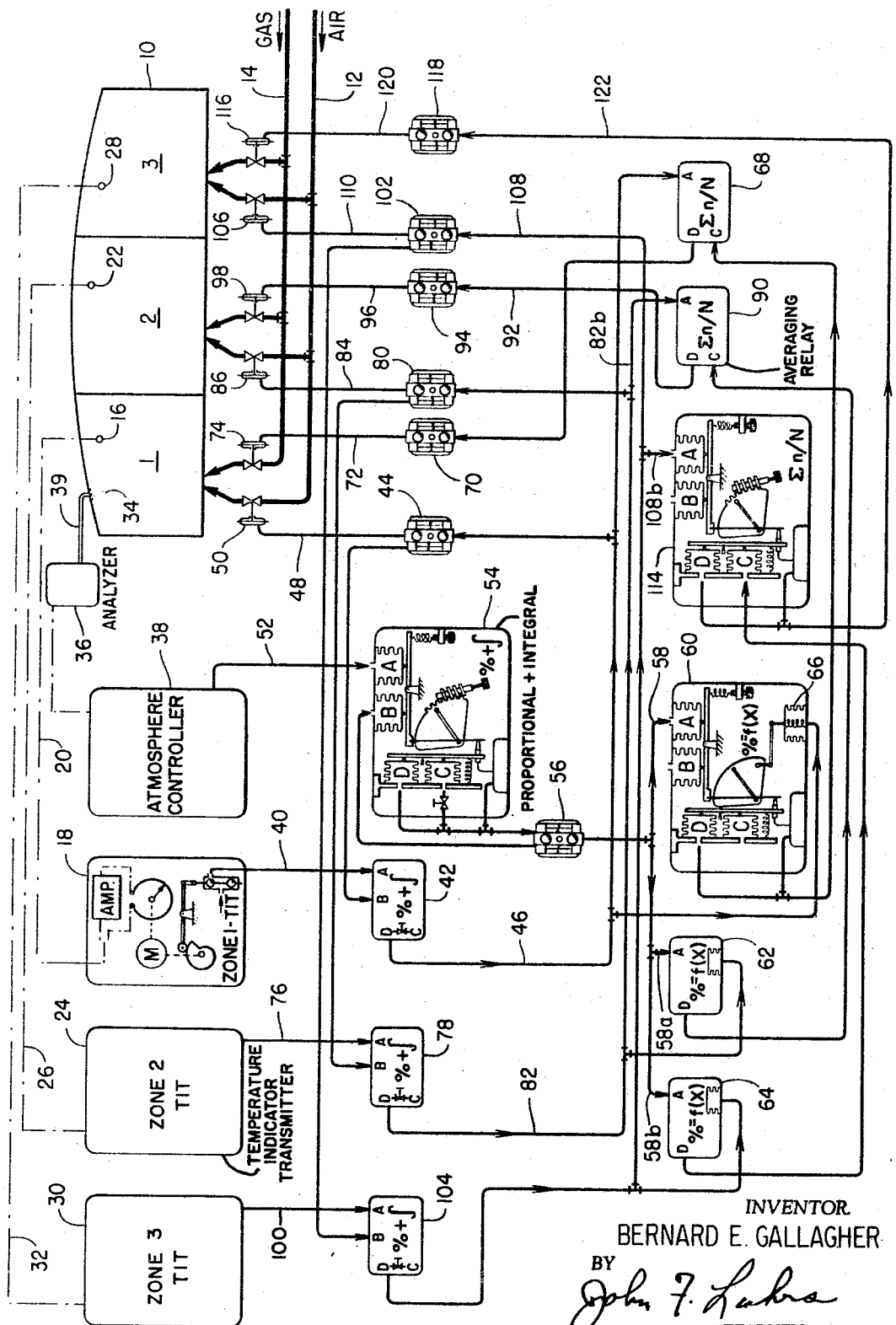

3,319,887
MULTI-ZONE FURNACE TEMPERATURE AND
ATMOSPHERE CONTROL
Bernard E. Gallagher, Indianapolis, Ind., assignor to
Bailey Meter Company, a corporation of Delaware
Filed Feb. 28, 1964, Ser. No. 348,236
6 Claims. (Cl. 236—15)

This invention relates to apparatus for controlling heat treating furnaces. In particular this invention relates to a system for controlling the atmosphere and temperature in a multi-zone annealing furnace such as used in annealing steel, brass, aluminum and glass products.

The effect of a heat treating operation on the surface condition of a product manufactured from steel, for example, is influenced by the time of heating, the temperature level maintained and the atmosphere surrounding the material. By controlling atmospheric gases in the working chamber a clean scale-free surface is obtained. Such a surface is required for most sheet and strip material and other important steel products, such as wire and tubes. The three gases most injurious to surface conditions are oxygen, carbon dioxide, and water vapor. Oxygen reacts with the iron of the steel to produce iron oxide. Carbon dioxide in combination with carbon monoxide will scale the steel above a certain ratio of carbon dioxide to carbon monoxide. Water vapor is oxidizing to the iron and combines with carbon of steel and often causes formation of a blue oxide during the cooling cycle. Nitrogen, on the other hand, in the molecular state, is entirely passive to iron and is entirely satisfactory for bright annealing. In controlling heat treating furnaces it is, therefore, necessary to include control of atmospheric conditions in order to produce the desired end product.

Not to be overlooked in controlling heat treating furnaces is the accurate control of temperature. Continuous type annealing furnaces are divided lengthwise into zones each having individual automatic temperature control. First, the work piece enters a heating zone which is temperature controlled to bring the material to its annealing temperature. The work piece then enters an annealing zone where the temperature is maintained just above the transformation range of the particular material being annealed. Finally, there are a series of cooling zones for gradual reduction of the annealed material to ambient temperature. Temperature control through the various zones is essential in order to produce the desired annealed properties.

The system I have invented controls both zone temperature and furnace atmosphere. Each zone is equipped with individual temperature controls set to produce the desired annealed properties. Furnace atmosphere is controlled by measuring the atmosphere in one zone which is then used to correct combustion air or fuel flow to the individual zones.

In accordance with my invention I provide a system that controls both atmosphere and temperature in a multi-zone furnace.

Also in accordance with my invention I provide a system that controls the atmosphere of a multi-zone annealing furnace from a single zone measurement.

Further in accordance with my invention I provide a system that controls zone temperature in a multi-zone heat treating furnace from individual zone measurement, and furnace atmosphere from a single zone measurement.

Various other objects and advantages of my invention will become evident from the following description of one embodiment of the invention and the novel features will be particularly pointed out in the appended claims.

In the figure, I show a schematic layout of the 3-zone furnace with pneumatic control for temperature and atmosphere.

I have elected to describe my invention with respect to control of a steel annealing furnace. It should be understood this is merely a preferred embodiment since the system is equally adaptable to controlling brass, aluminum and even glass annealing furnaces.

Also I have chosen to describe my invention with reference to a pneumatic control system. Either electrical or hydraulic systems could be substituted for the pneumatic I describe. I chose a pneumatic system in the belief the control elements are better understood by those skilled in the art.

Before detailing my control system a brief description of its operation is believed advantageous. Each furnace zone is equipped with a temperature sensing device, such as a thermocouple. The electrical output of the thermocouple is converted to a proportional pneumatic signal. In my system this conversion takes place in a series of indicator recorders. Since each zone is maintained at a different temperature the system also includes a plurality of pneumatic signal generators to establish the zone "set point" temperature. The deviation signal, that is, the difference between "set point" temperature and actual zone temperature, is the input to a proportional plus reset controller. Controllers of the proportional plus reset type develop an output signal which varies proportionally and as the time integral of the difference or error signal. A combustion air control valve is connected to the controller and positioned in accordance with its output signal. Each zone is equipped with a proportional plus reset controller and a combustion air control valve for controlling combustion air flow.

To control furnace atmosphere one zone is equipped with a gas sampling device which continuously analyzes furnace atmosphere for the amount of combustible constituents. Again a pneumatic signal generator is used to establish the desired set point of atmospheric condition. The difference between the analyzer output and the set point signal determines the correction required to maintain the desired atmospheric conditions. Correcting this difference is brought about by the use of a proportional plus reset controller connected to receive said difference signal. The loading pressure from the atmosphere controller is connected to a plurality of compensating relays one for each furnace zone. These relays have their proportional band setting continuously adjusted by an index of combustion air flow. The compensating relay output signal is averaged with zone temperature to develop a fuel valve control signal. Fuel flow to each zone is controlled primarily from individual zone temperature and corrected to maintain a set atmospheric condition from an atmospheric analysis in one zone.

Although somewhat brief this description emphasizes that for each zone combustion air is controlled from individual zone temperature and fuel flow from zone temperature with a correction from furnace atmosphere.

Referring now to the drawing I show a multi-zone annealing furnace 10 having zones 1, 2, and 3 as indicated. Each zone is individually supplied combustion air and fuel through conduits 12 and 14 respectively. Zone 1, which I consider the heating zone, is equipped with a thermocouple 16 for measuring zone temperature. The direct current thermocouple signal is connected to an indicator recorder 18 through a line 20. Zone 2, which I consider the annealing zone, is also equipped with a thermocouple 22 which is likewise connected to an indicator recorder 24 through a line 26. Zone 3, which I consider the cooling zone, has a similar arrangement. Thermocouple 28 measures zone 3 temperature and is connected to an indicator recorder 30 through a line 32.

As mentioned earlier the control system being decribed operates from a pneumatic signal. Therefore, the zone temperature measurements generated by thermocouples 16, 22, and 28 must be converted from electric to pneumatic signals. Included within the indicator recorders 18, 24, and 30 are pneumatic signal generators which respond to mechanical input signals. These indicator recorders may take the form of structure disclosed in an application of P. S. Dickey, Ser. No. 236,612, filed July 13, 1951, now abandoned.. Sufficient details of internal structure of indicator recorder 18 has been illustrated to appreciate that a motor maintains an electric network in balance and simultaneously actuates a cam which controls the output of a pneumatic generator. The output of indicator recorder 18 is a pneumatic pressure in pipe 40 representative of the temperature to which thermocouple 16 is exposed.

Indicator recorder 18 is a means whereby the electrical characteristics of a thermocouple 16 is transduced into a pneumatic pressure in pipe 40. The cam-link between the balancing motor of an electric network and the pneumatic generator may be given a predetermined shape. In my control system it is desired that the cam be shaped so a pneumatic pressure is established in pipe 40 which represents values of temperature to which the thermocouple 16 is exposed.

A proportional plus reset relay 42 is shown responsive to pressures established in pipe 40. These pressure signals are introduced into chamber A of relay 42 thereby producing an increasing output pressure with an increasing input pressure. This relay may be of the type shown and disclosed in United States Patent 2,805,678, issued to Michael Panich on Sept. 10, 1957.

Into chamber B of relay 42 is introduced a manually adjustable loading pressure which establishes the "set point" for zone 1 temperature. The "set point" is that temperature at which it is desired to control zone 1. When the loading pressures introduced into chambers A and B are equal or stand in a predetermined relation to each other, the actual zone temperature will equal the desired temperature. The manually adjustable signal introduced in chamber B is generated by a signal source included in a selector station 44. A convenient means for adjusting the "set point" loading pressure is provided in said selector station 44 which may be of the type illustrated and described in United States Patent 2,747,595 issued to P. S. Dickey on May 29, 1956.

The output pressure from chamber D of the proportional plus reset relay 42 changes in proportion to the difference between loading pressures in chambers A and B. By virtue of a restricted connection to chamber C the output from chamber D continues to change at a slow rate so long as the pressures in chambers A and B are not equal or depart from their predetermined relation. Thus relay 42 is spoken of as a "proportional plus reset type" in that it serves to cause immediate changes proportional to the amount of departure from a desired value and thereafter a continuing change until the actual value is restored to the desired value.

The output pressure from relay 42, after passing through a pipe 46 and selector station 44, is transmitted through a pipe 48 to a diaphragm operated valve 50. As shown in the figure, valve 50 regulates combustion air to zone 1 of the furnace 10. My system would operate with equal efficiency if the diaphragm operated valve 50 was connected to control fuel flow instead of combustion air as shown. This is readily apparent in view of the fact that both combustion air and fuel flow are controlled from temperature. The atmosphere measurement is a corrective signal and can correct either air or fuel in order to maintain proper atmospheric condition.

Also responsive to the pressure in chamber D of relay 42 is an averaging relay 68. Introduced into chamber C of relay 68 is the loading pressure from a proportional adjustment relay 60. The need and function of relay 60 will be explained shortly. Averaging relay 68 serves to produce an output pressure at its D chamber which is proportional to the sum of loading pressures established by relays 42 and 60. Relay 68 and the other averaging relays of my system, may, for example, be of a type illustrated and described in the Panich Patent 2,805,678.

After being transmitted through a selector station 70 the loading pressure from relay 68 is passed through a pipe 72 to a diaphragm operated fuel control valve 74. The selector station 70, like all selector stations of my system, provides a means for transferring from automatic to remote manual operation and vice versa. It also supplies a convenient means for adjusting the fuel valve 74 with the system in remote manual operation.

As mentioned previously, the temperature of zone 2 is measured by thermocouple 22 and recorded in indicator recorder 24. Indicator 24 is similar to indicator 18 and is equipped to produce a pneumatic loading pressure in pipe 76 proportional to zone 2 temperature. A second proportional plus reset relay 78, similar to relay 42, is responsive to signals established in pipe 76. This relay receives the pressure in pipe 76 at chamber A. Again, there is a loading pressure introduced into chamber B of relay 78 from a selector station 80 which establishes a "set point" temperature for zone 2.

It will be noted the temperature control system for zone 2 is identical to that described with respect to zone 1. Thus, the output of relay 78, after passing through pipe 82 and selector station 80, is transmitted through a pipe 84 to a diaphragm operated combustion air control valve 86. The loading pressure from chamber D of relay 78 is also transmitted through pipe 82b to chamber A of a second averaging relay 90. A signal is also introduced into chamber C of averaging relay 90 from chamber D of a second proportional adjustment relay 62. The purpose and function of relay 62 will be explained along with the description of relay 60. From chamber D of relay 90 a loading pressure is transmitted through pipe 92, selector station 94 and pipe 96 to a diaphragm operated fuel control valve 98 for control of fuel flow to zone 2.

With regards to zone 3 its temperature control system is similar to that already described with respect to zones 1 and 2. The indicator recorder 30 is provided with a pneumatic signal generator which produces a pneumatic signal in pipe 100 proportional to the temperature existing in zone 3. To establish the set point temperature for zone 3 a selector station 102 produces a pneumatic signal which is introduced into chamber B of a proportional plus reset relay 104. Introduced into chamber A of relay 104 is the pneumatic signal as developed in pipe 100.

The loading pressure from chamber D of relay 104 is transmitted to a diaphragm operated combustion air control valve 106 through selector station 102 and pipes 108 and 110. This signal is also transmitted to chamber A of an averaging relay 114 through pipe 108b. Averaging relay 114 is also responsive to the output of a third proportional adjustment relay 64 as connected to chamber C. Fuel flow to zone 3 is controlled by the output loading pressure of relay 114 by means of a diaphragm operated fuel control valve 116. The diaphragm operated valve 116 received the loading pressure from relay 114 through a selector station 118 and pipes 120 and 122.

Having completely described a system for maintaining individual zone temperature I now turn to a consideration of my unique atmosphere control. Included in zone 1 of furnace 10 is a gas sampling tube 34 which supplies a continuous sample to a gas analyzer 36 through a pipe 39. Gas analyzers, per se, are old and their operation well known both for determining the percentage of free oxygen or percent of combustible constituents in the gaseous sample. In my system the analyzer is arranged to determine only the combustible constituents of furnace atmosphere. Although many types of gas analyzers are available and could be used the one I employed operates as follows. The gas to be analyzed is mixed with a fuel and brought in contact with a catalyst wire forming one leg of a Wheatstone bridge. Changes in wire temperature, due to combustion thereon, acts to change the wire resistance to current flow. This bridge is part of a circuit located in a combustibles indicator 38 which is sensitive to the bridge unbalance. A complete and thorough description of the gas analyzer I used is found in United States Patent 2,652,315, issued to J. E. McEvoy on Sept. 15, 1953.

Combustibles indicator 38, which received the electrical signal from gas analyzer 36 is similar in construction and operation to the indicator recorder 18. Indicator 38 also has a cam-link arrangement that establishes a pneumatic pressure in pipe 52 which is representative of atmospheric conditions existing in zone 1. A proportional plus reset relay 54, similar to relay 42, is shown responsive to the pneumatic signal in pipe 52. Chamber B of relay 54 has introduced therein a manually adjustable loading pressure from a selector station 56. Selector station 56, like all selector stations in my system, are similar and fully described in the aforementioned patent issued to Michael Panich, 2,805,678. The signal introduced into chamber B establishes a "set point" around which the atmosphere of the furnace is controlled.

Relay 54, being similar to relay 42, has an output pressure at chamber D which varies both proportionally and as the time integral of the difference between loading pressures in chambers A and B. The output pressure at chamber D of relay 54 is transmitted through pipes 58, 58a, and 58b, after passing through selector station 56 to the A chambers of the three proportional adjustment relays 60, 62, and 64. Referring in particular to relay 60, the loading pressure established in chamber D is equal to a pressure introduced into chamber A times the proportional constant. Relay 60 is equipped to receive into an integral bellows 66 a pneumatic signal from chamber D of relay 42 for automatic adjustment of the proportional band. It will be noted the loading pressure established by relay 42 adjusts the proportionality constant of relay 60 rather than merely adding or subtracting from a loading pressure which is proportional to atmospheric conditions. Thus, at low rates of air flow to zone 1, a given change in loading pressure established by relay 54 will cause a proportionally smaller change of pressure in chamber D of relay 60 than the same change in loading pressure established by relay 54 at high rates of air flow. The loading pressure to bellows 66 is in effect a measure of air flow and determines the amount of corrective action to furnace atmosphere. For a complete description of relays 60, 62 and 64 reference is made to United States Patent 2,743,710, issued to Jack F. Shannon on May 1, 1956.

The need for proportional adjustment relays 60, 62 and 64 should be apparent if it is remembered the gas analyzer determines combustible constituents without reference to the firing rate. Of course a different corrective action is required to maintain a given atmosphere at low firing rates than at high. Therefore, to properly correct the atmosphere to a given set point some reference must be made to the amount of either fuel or air flow supplied the individual zones. Relays 60, 62, and 64 do precisely this; they condition the correction to atmosphere in accordance with combustion air flow. The correction introduced by the atmospheric measurement is proportional to firing rate.

Reviewing for a moment the temperature control system, it will be remembered the output loading pressure of relays 60, 62 and 64 is transmitted to chamber C of averaging relays 68, 90 and 114 respectively. For zone 1 the fuel flow is determined by an average of zone 1 temperature and zone 1 atmosphere. Fuel flow to zone 2 is controlled by an average of zone 2 temperature and zone 1 atmosphere. Zone 3 has fuel flow controlled by zone 3 temperature and zone 1 atmosphere. In each zone the atmosphere analysis from zone 1 corrects the fuel flow. This results in a reduction of the complexity and cost of an annealing furnace control system.

Operating as a single unit the three temperature control systems and the atmosphere control system efficiently control both temptrature and atmosphere in any multi-zone heat treating furnace. Individual zone temperatures are maintained by individual zone measurements and the atmosphere is controlled from the analysis in one zone. Primarily the atmosphere control system modifies the excess air as produced by the combustion process. Whether fuel or combustion air is used to adjust the excess air is a matter of personal preference.

It will thus be seen that the objects set forth above and those made apparent from the preceding description are effectively obtained. Since certain changes may be made in the above equipment without departing from the scope of my invention, it is intended that all matters contained in the above description and shown in the accompanying drawing shall be interpreted as illustrative and not as limiting.

What I claim as new, and desire to secure by Letters Patent of the United States is:

1. Apparatus for controlling the temperature and atmosphere in a multi-zone annealing furnace, comprising, means for analyzing the atmosphere in one zone of a multi-zone furnace, means for measuring the temperature in each zone of said multi-zone furance, a plurality of means for establishing the temperature setpoint in each of said furnace zones, said setpoint means individually connected to said temperature measuring means, a plurality of means responsive to the difference between the established setpoint signals and the measured temperature signal for producing an output signal which varies as the time integral of said difference, said means being individually responsive to the difference signal of one zone of said multi-zone furnace, a plurality of burners, each zone of said furnace having at least one of said burners, a plurality of combustion air control means individually connected to one of said burners and responsive to the time integral signal of the zone in which said burner is located for controlling the flow of combustion air, a separate setpoint means for establishing the desired atmospheric condition in said multi-zone furnace, a separate means responsive to the difference between the established setpoint atmospheric condition and the measured atmospheric condition for generating an output signal that varies in accordance with the time integral of said difference, a plurality of compensating means individually responsive to the temperature level in one zone of said furnace and collectively responsive to the atmospheric analysis thereby establishing a signal for each zone proportional to the temperature and atmospheric analysis, a plurality of means for averaging the temperature signal and the compensating means output, each zone control equipped with one of said averaging means, and a plurality of fuel control means individually connected to the burners of one zone, said fuel control means individually responsive to the averaging means associated with the zone wherein said burner is located for controlling the fuel flow primarily from temperature with a correction from atmosphere.

2. Apparatus for controlling the temperature and atmosphere in a multi-zone annealing furnace, as set forth in claim 1, wherein said compensating means includes a relay wherein the proportional band is adjusted in accordance with said temperature measurement.

3. Apparatus for controlling the temperature and atmosphere in a multi-zone annealing furnace, as set forth in claim 2, wherein said averaging means includes a relay the output of which is the algebraic sum of two input signals.

4. Apparatus for controlling the temperature and atmosphere in a multi-zone furnace having a burner located in each zone for supplying the elements of combustion thereto, a temperature responsive means for each zone generating a first signal corresponding to the temperature of the zone, control means for each zone responsive to the signal corresponding to the temperature of the zone regulating the flow of one element of combustion to the burner located in the zone, means generating a second signal corresponding to the atmospheric analysis in a selected one of said zones, a compensating means for each zone responsive to the signal corresponding to the temperature of the zone and to said second signal generating an output signal corresponding to the temperature of the zone modified by the atmospheric analysis and an averaging means for each zone responsive to the output signal generated by the compensating means for the zone and the signal corresponding to the temperature of the zone regulating the flow of another element of combustion to the burner located in the zone.

5. Apparatus according to claim 4 wherein said one element of combustion is air and the other element of combustion is fuel.

6. Apparatus according to claim 5 wherein the element of combustion regulated by the control means for each zone is air and the element of combustion regulated by the averaging means for each zone is fuel.

References Cited by the Examiner

UNITED STATES PATENTS

| | | | |
|---|---|---|---|
| 2,052,375 | 8/1936 | Wunsch et al. | 236—15 |
| 2,324,821 | 7/1943 | Campbell | 236—15 |
| 2,518,996 | 8/1950 | Peckham | 236—15 |
| 2,652,315 | 9/1953 | McEvoy | 23—255 |
| 2,664,245 | 12/1953 | O'Connor et al. | 236—15 X |
| 2,998,195 | 8/1961 | Kahn | 236—15 |
| 3,010,657 | 11/1961 | Post | 236—15 |
| 3,028,095 | 4/1962 | Hornfeck | 236—15 |

ROBERT A. O'LEARY, *Primary Examiner.*

ALDEN D. STEWART, *Examiner.*